Oct. 6, 1964　　　P. E. GLASER ETAL　　　3,151,364
INSULATION
Filed April 20, 1959　　　　　　　　　　　　　3 Sheets-Sheet 1

INVENTORS
PETER E. GLASER
WARREN A. SALMON
ALFRED G. EMSLIE

BY
ATTORNEY

Oct. 6, 1964

P. E. GLASER ETAL 3,151,364

INSULATION

Filed April 20, 1959

INVENTORS
PETER E. GLASER
WARREN A. SALMON
ALFRED G. EMSLIE

BY
ATTORNEY

3,151,364
INSULATION
Peter E. Glaser, Somerville, Warren A. Salmon, Lexington, and Alfred G. Emslie, Scituate, Mass., assignors to Arthur D. Little, Inc., Cambridge, Mass., a corporation of Massachusetts
Filed Apr. 20, 1959, Ser. No. 807,351
4 Claims. (Cl. 20—4)

This invention relates to insulation and more particularly to an insulating material suitable for very low-temperature and very high-temperature applications.

The very marked increase in the use of liquefied gases has indicated a need for more efficient insulation systems for storing and handling these extremely cold liquids with a minimum loss due to heat leaks. At the same time recently developed techniques in industry have dictated the need for more efficient high-temperature insulation systems. For example the handling of molten materials, e.g., metals, which must be transported or stored requires extremely efficient high-temperature insulation. There are also a number of industrial processes which must be carried out at extremely high temperatures and which must be isolated for the sake of comfort, efficiency and safety.

The prior art concerned with low-temperature insulation has been directed primarily to the use of a vacuum with or without the use of an insulating material such as perlite, a finely divided volcanic glass. However, now with the requirement that systems must be capable of the insulation of liquids the temperatures of which may approach absolute zero, it is necessary to provide an insulation system to meet such a performance requirement.

The prior art concerned with high-temperature insulation is essentially one which has developed as the requirements have become more stringent. High-temperature insulation began essentially with packing or wrapping with a number of poor heat conductors (ceramic fibers, asbestos and the like). It proceeded then to the use of evacuated areas surrounding the high temperature to be insulated and then to the use of evacuated panels containing insulation materials. The art has also encompassed the use of numerous constructions and designs to lengthen heat leak paths and the like. Each of these prior art systems has been essentially satisfactory in providing insulation against the temperatures for which they were designed; but the use of continually higher temperatures demands more efficient high-temperature insulation systems. Such systems suitable for insulation of temperatures up to around 600° F. are now known, but it is now desirable to provide insulation systems which are capable of handling (i.e., furnishing protection for) temperatures of the order of 3000° F.

It is therefore an object of this invention to provide insulation materials, suitable for use in insulating structures, which minimize heat transmission across the structures whether the system to be insulated is at a very low temperature or a very high temperature. The term "structure" is used hereinafter to designate any enclosed space (which may or may not be evacuated) which may be filled, or partially filled, with an insulating material. Such structures include, but are not limited to panels, blankets, walls, housings and the like.

It is a further object of this invention to provide insulation materials which exhibit a relatively low density and hence a low $\rho k$ factor which is the product of density ($\rho$) times the coefficient of thermal conductivity ($k$). It is yet another object to provide an insulation system which is inexpensive and easy to prepare and use, but which can achieve a high degree of insulation even at extremely low or high temperatures. These and other objects will become apparent in the following description of this invention.

Briefly the insulation material of this invention may be defined as a new and novel composition of matter comprising radiant energy absorbing and re-emitting particles, radiant energy scattering and reflecting particles of a high refractive index material, and a carrier medium which may be particles of a refractory material, heat-resistant fibers or a combination of both.

The insulating material formed in accordance with this invention may be used in any structural shape designed to insulate a system. When the insulating material is used in a thin-wall panel, for example, and the space within the panel evacuated, there results an extremely efficient insulation, even when the system to be insulated is at liquid helium temperatures, for example, or when the temperature differential across the panel is as much as 3000° F. in a high-temperature application. The insulating structures may be modified by having the inside surfaces thereof treated to achieve very low emissivity and they may also contain radiation shields, the latter being supported and held in proper relation within the panel by the carrier medium.

This invention will be further described in the following discussion and with reference to the drawings in which.

Figure 1:
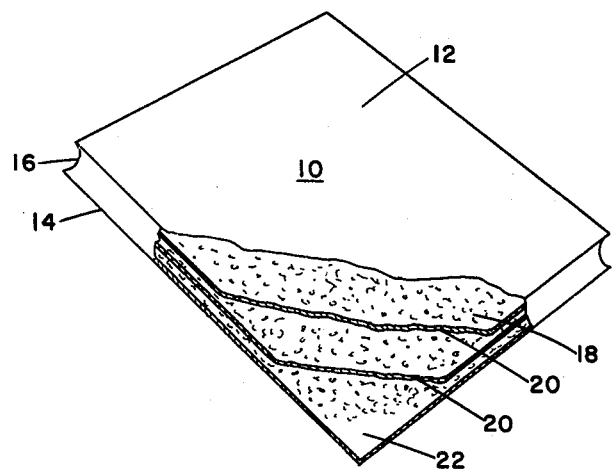
FIG. 1 shows a typical insulating panel (partly in cutaway view) in which the insulating material of this invention may be used.

It is known that heat is transferred by one or a combination of three processes: convection, conduction and radiation. It has long been known that heat transferred by gas convection and conduction can be materially reduced or even overcome by a high degree of evacuation. This means then that in an evacuated insulating panel heat from outside in or from inside out is transferred almost exclusively by particle conduction and radiation and that any insulating material designed to operate efficiently where the temperature difference extends up to the range of 3000° F., as in high-temperature insulation, must provide extremely efficient means for reducing heat transfer by particle conduction and radiation.

The kinetic theory of gases can be used to explain how fine particles become excellent insulators under vacuum. The thermal conductivity of a gas is proportional to the mean-free path of its constituent molecules and to the gas density. As the gas pressure is lowered the density decreases and the mean-free path increases until it exceeds the average particle spacing. At the lower densities, inter-molecular collisions lose their importance until finally the gas molecules travel unhindered between the confining walls of the adjacent solid particles; therefore, the particle structure imposes an upper limit on the mean-free path within the insulation. As the pressure is further lowered, and more gas molecules are being removed, less heat is transferred and the thermal conductivity decreases substantially until a lower limit of thermal conductivity is obtained when virtually all gas molecules have been removed. At this lower limit, thermal conductivity still has a finite value because heat can be transferred by solid conduction through the particles and by radiation. The larger the particle spacing with a correspondingly larger mean-free path of the gas molecule, the lower the pressure has to be for the limiting value of thermal conductivity to be approached.

At the relatively high temperatures encountered in the use of the insulation material of this invention, the thermal conductivity of an evacuated insulating particle or fiber will then depend upon the particle size, particle spacing, emissivity of the inside surfaces defining the insulation structure, thermal radiation through the solid particles, and the packing density of the insulating material.

At temperatures up to a few hundred degrees Fahrenheit the residual heat transfer across an evacuated layer is due mainly to thermal conduction along devious paths through the powdered particles. However, at high temperatures radiation transfer through the particles and across the evacuated spaces between particles causes a high effective thermal conductivity if steps are not taken to block the radiation.

Three distinct methods for doing this can be considered, based on absorption, reflection and scattering of the radiation, respectively. Absorption depends upon the attenuation of radiation by substances such as carbon powders. The reflection method involves incorporating a large number of radiation shields either as large sheets within the layer of powder, or in the form of metallic flakes, or as a combination of these. For a given number of shields in series the net radiant flux is inversely proportional to the number and directly proportional to the emissivity of the shield material and to the difference in the fourth power of the absolute temperature between the high and low temperature sides of the layer. Thus, low heat transfer is attained by including a large number of low-emissivity sheets or flakes or a combination of both in the evacuated layer.

The scattering method depends on the idea of reversing the radiation by employing in the barrier layer small particles of high refractive index. Suitable particles may be composed of alumina or magnesia. Radiation entering a particle is reflected internally and re-emerges in the backwards direction. Multiple scattering of the radiation by a large number of particles provides a very effective barrier to the radiant flux. The total scattering cross-section per unit volume should be as large as possible, which means that the refractive index should be large and the particle size small, but still above the Rayleigh region of small scattering.

In choosing insulation material which will minimize heat transfer by conduction and radiation, it may be seen that the material must have certain properties. Among these are low-density, high-compressive strength, a softening point above the maximum operating temperature, and minimum contact areas between individual particles. Moreover, there should be no sintering during use. The material should be able to act as a radiation shield, the particle size should be distributed to minimize compaction and should be smaller than the mean-free path of the residual gas at the lowest operating temperature and pressure.

We have found that no one material can meet these requirements but that a combination of three distinct types of materials as defined below can serve as a most effective barrier to the transmission of heat. The insulation of this invention is equally effective where the system to be insulated is at extremely low or extremely high temperatures compared to the surrounding temperature.

In providing an insulating material which can meet the requirements of aircraft structures, for example, it is, of course, necessary to minimize the factor $k$ (coefficient of thermal conductivity) as well as the factor $k\rho$ where $\rho$ is the density. Other applications may also, of course, require minimizing $k\rho$.

In forming an insulation material suitable for filling an insulation structure designed as a low-temperature or a high-temperature insulation barrier, we have found that it is necessary to use a physical mixture of three types of particles, each type of which has a certain combination of physical and chemical characteristics. Moreover, the particle size range of each type and the amount of it present in the mixture is important to attain the desired results.

These three types of particles include those which are capable of absorbing and re-radiating or re-emitting radiant energy, particles which are capable of scattering and reflecting radiant energy, and finally, particles which serve as carriers for the two remaining types of particles. These so-called carrier particles may be supplemented or substituted in their functions by fibers which are not affected by the temperatures involved. Preferably such fibers will have very fine diameters (in the range of about 0.1 to 50 microns, depending upon the desired structural properties) and will be of a mineral origin. Examples of such fibers include, but are not limited to, glass, asbestos and the like.

The particles which are capable of absorbing radiant energy preferably range in size from 1 to 50 microns and include such materials as carbon black, colored ceramic particles or metallic oxides capable of absorbing radiant energy. These particles are present in the physical mixture making up the insulating material in a range from 5 to 50% by weight.

The second type of particles are those which are capable of scattering and deflecting radiant energy. These may further be defined as materials which have high refractive indices, and for which the total scattering cross-section per unit volume is as large as possible. In the insulation material of this invention the scattering particles should raange from 0.1 to 20 microns in size. For some applications these radiant-energy scattering particles may be omitted entirely, although it is preferable to include them since insulation material containing these scattering particles has been found to be more efficient; particularly in high-temperature applications. These particles may be present in a range from about zero to 40% by weight and preferably from about 10 to 40% by weight. Among suitable scattering particles may be listed flakes of aluminum, gold, silver, rhodium, magnesium oxide and the like. Materials, such as potassium titanate, which are known to be good scattering agents may also be used in the insulation material as radiant energy scattering and reflecting particles.

Finally, there must be provided a finely divided carrier present in an amount ranging from 50 to 90% by weight. The carrier should be capable of physically supporting the radiant energy absorbing particles and the radiant energy scattering and reflecting particles as well as any radiation shields in thin foil or sheet form which may be included in the panel. In addition to offering physical support to the remaining particles, the carrier serves to space the radiant energy absorbing and re-emitting particles and the scattering and reflecting particles throughout the insulation structure. Moreover, in so-called thin-skin vacuum insulation where the outer skin acts only as a vacuum barrier and need not exhibit any structural strength, the carrier portion of the insulating material contained therein may be used to transmit loads to an underlying load-carrying system.

The carrier is preferably a finely divided refractory material, in particulate or fiber form, having a melting point above about 3000° F. if required for high-temperature applications and a loose density ranging from 3 to 25 pounds per cubic foot. If in particulate form, the particle size of the carrier should preferably range between 200 A. and five microns. Typical carrier particles include alumina, zirconia, titania and the like in finely divided form. If the carrier is in the form of very thin fibers, fibers of mineral origin, e.g. glass or asbestos, may be used.

The diameter of such fibers, usually ranging from about 0.1 to about 50 microns, will be governed by the role of the carrier. For example, if the carrier portion of the insulation is used to transmit appreciable loads, then the larger diameter fibers are to be preferred.

The carrier medium, i.e., particles or fibers, may be partially fused either before being mixed with the other particles or after the physical mixture is made. Carrier particles may be fused to carrier fibers as well as fused with other carrier particles and, of course, the fibers may be fused to each other.

Particulate matter and fibers may be used together in all proportions to form the carrier medium or they may be used exclusively.

Each of the three types of particles required in the insulation material may, of course, comprise mixtures of two or more components, e.g., the scattering particle portion may be a mixture of aluminum flakes and potassium titanate.

The ranges in which each of these three types of particles are present in the insulation material of this invention have been indicated above. We have found that although compositions falling within these ranges are all suitable for high temperature insulation, a preferable composition consists of about 60% by weight finely divided alumina as the carrier particles, 20% by weight carbon black as the radiant energy absorbing particles and 20% by weight aluminum flakes as the radiant energy scattering and reflecting particles. The mixture has a density ranging from about 7 to 12 pounds per cubic foot. In the performance curves of FIGS. 2–6, it will be shown how this insulation when used in an evacuated panel (for example) materially reduces both the coefficient of thermal conductivity, $k$ and the product $k\rho$, where $\rho$ is the density.

FIG. 1 illustrates a typical insulating structure containing the insulating material of this invention. The thin-skinned evacuated panel of FIG. 1 is used as a typical illustration of an insulation structure as defined above.

In FIG. 1 a thin wall panel 10 is made up of an upper and lower sheet 12 and 14, respectively, joined by a suitable joining strip 16. The insulating material 18 of this invention may be introduced into the panel by any suitable means, and the panel evacuated by methods known in the art. FIG. 1 also illustrates how one or more thin radiation shields 20, located in the panel, may be separated and held in place by the insulating material and more particularly by the carrier particles with or without additional fibers. Such radiation shields 20 may be of thin aluminum, gold, silver or rhodium foil. Finally, the inside surfaces, such as 22, of the panels may be treated as by plating with silver to reduce the emissivity of these surfaces to a minimum. A suitable treatment for forming very low emissivity surfaces is described in U.S.P. 2,776,069.

The performance of the insulation of this invention in its application to high-temperature systems (i.e., where systems up to 3000° F. are to be insulated from their surroundings) is presented below with references to FIGS. 2–6. The performance of the insulation of this invention in its application to low-temperature systems (i.e., where systems containing liquefied gases down to about −450° F. are to be insulated from their surroundings) is presented below after the discussion of FIGS. 2–6.

Figure 2:
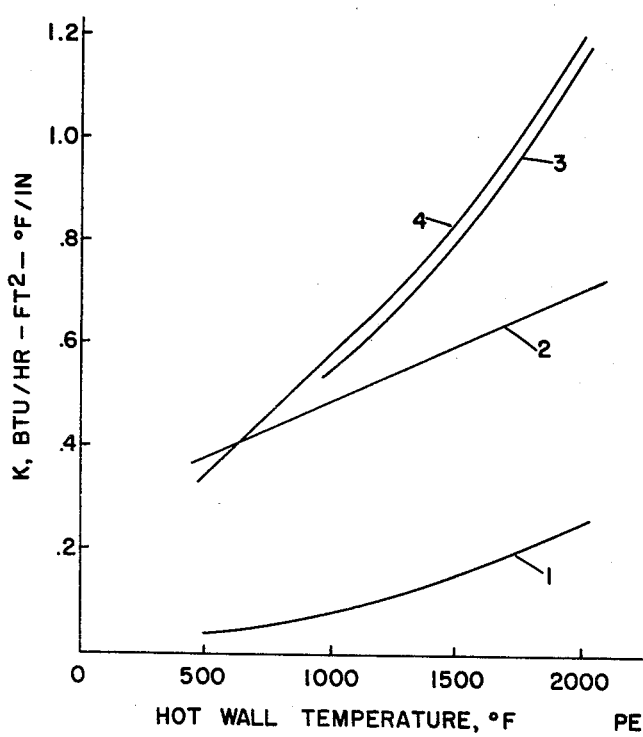
FIG. 2 is a plot showing how the coefficient of thermal conduction varies with hot-wall temperature for the insulating material of this invention, and offers a comparison with commercially available materials.
Figure 4:
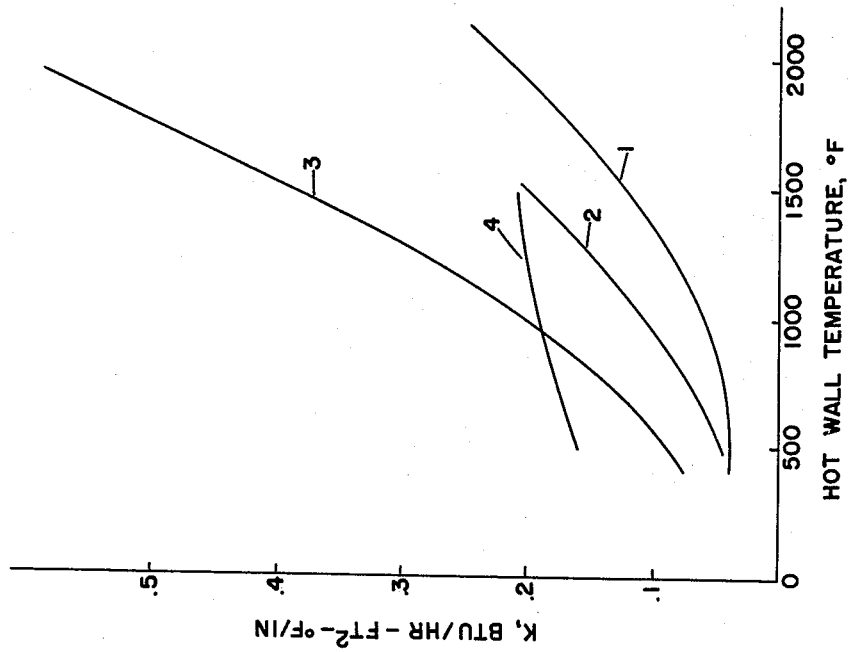
FIG. 4 is a plot showing the relationship between thermal conductivity and hot-wall temperature for a number of insulation material combinations.
Figure 3:
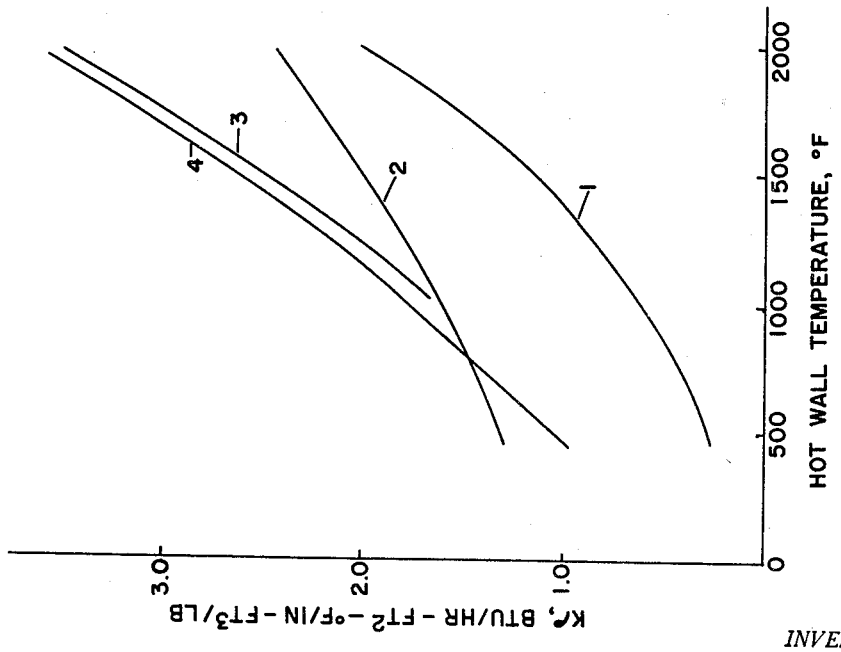
FIG. 3 is a plot, as in FIG. 2, showing the relationship of hot-wall temperature and the product of coefficient of thermal conduction and density for the same materials as in FIG. 2.

Turning now to FIGS. 2–4, the high efficiency of the insulation material of this invention at high temperatures, compared with known insulation material, is shown. In FIG. 2 the coefficient of thermal conductivity, $k$, is plotted against the temperature of the hot wall of a test panel. In these measurements the cold wall temperature was 80° F. which means that in the higher ranges the hot wall temperature was virtually the temperature difference across the panel. Curve 1 of FIG. 2 represents the performance of the preferred combination of insulation material of this invention. Curve 2 illustrates the performance of potassium titanate, considered to be good insulating material, which curves 3 and 4 represent the performance of two commercially available insulation materials consisting of ceramic fibers.

In FIG. 3 the product of $k\rho$ is plotted against hot wall temperature in the same manner in which $k$ was plotted in FIG. 2. The numbers assigned to the curves correspond to those assigned in FIG. 2. Again it will be seen that even though the insulation material of this invention has a density of 7.7 pounds per cubic foot in the samples used, it exhibits a performance superior to that of potassium titanate which in this sample has a density of only 3.4 pounds per cubic foot.

Finally, in FIG. 4 the necessity for using all three types of particles of our insulation material is shown. In this figure, as in FIG. 2, the coefficient of thermal conductivity is plotted against hot wall temperature. Again curve 1 illustrates the performance of the preferred insulation material of this invention. Curves 2 and 3 represent the performance of a mixture containing only a carrier (alumina) and a radiant energy scattering material (aluminum flakes), i.e., no radiant energy absorbing particles were present. The mixture represented in curve 2 contained a higher percentage of the scattering particles than that represented in curve 3. Finally, curve 4 represents the performance of potassium titanate alone.

Figure 5:
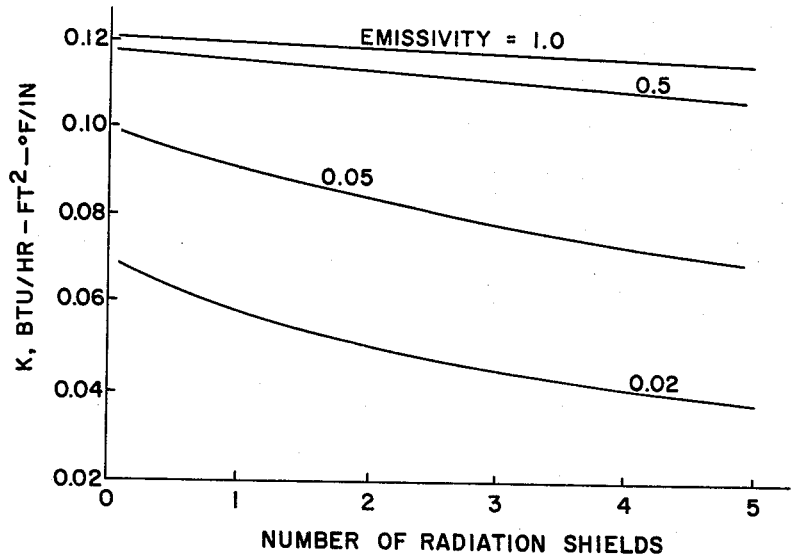
FIG. 5 is a plot illustrating the effect on the coefficient of thermal conduction of using radiation shields in a panel and of varying the surface emissivity.

FIG. 5 illustrates the improvement in performance which can be expected using the insulation material of this invention in connection with one or more radiation shields in an evacuated panel. Four curves are given illustrating progressively decreasing emissivities of the inside surfaces of the insulation panel. As indicated in FIG. 5, the emissivities of the inside surfaces of the insulation panel under evaluation were 1.0, 0.5, 0.05 and 0.02, reading from the top curve downwardly. The figures in FIG. 5 were obtained for a system wherein the temperature difference across a one-half inch panel was 1420° F. The density of the insulating material was 11.8 pounds per cubic foot and the pressure within the panel was reduced to 500 microns.

Figure 6:
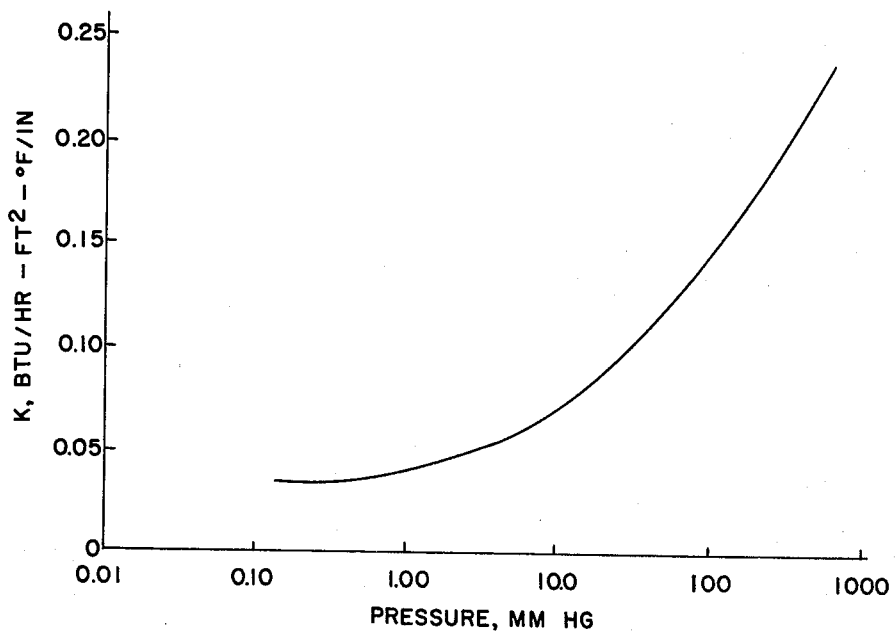
FIG. 6 is a plot showing the relationship between the extent of panel evacuation and coefficient of thermal conductivity.

Finally, FIG. 6 illustrates the benefits in lower coefficients of thermal conductivity to be realized in a system by evacuating the panel. Data in this figure were obtained for a one-half inch panel filled with the insulation material of this invention having a density of 11.8 pounds per cubic foot. The temperature difference across the panel was about 615° F. The plot of FIG. 6 illustrates that pressures in an evacuated insulation structure should probably not be greater than about 10 mm. Hg and preferably not greater than about 5 mm. The temperature of the system to be insulated will influence the degree of evacuation. Generally, the higher the temperature of the system to be insulated, the higher the pressure which may be tolerated within the insulation structure.

The insulation of this invention was evaluated for low-temperature applications by determining the coefficient of thermal conductivity, $k$, when the insulation was a mixture of 75% by volume of $SiO_2$ particles (average size about 0.02 micron serving as the carrier and 25% by volume of finely divided carbon black (average size about 0.5 micron) serving as radiant energy absorbing particles. No scattering particles were included. This mixture was equivalent to 75% $SiO_2$ particles and 25% carbon black by weight.

The insulation material was placed in a single guarded cold plate apparatus, the emissivities of the hot and cold plates were 0.86 and the temperature of the cold plate was −320° F. while that of the hot plate was about 50° F. Under these test conditions this insulation material packed to a density of 5 pounds/cubic foot and evacuated to less than $10^{-6}$ mm. Hg had an apparent $k$ value of 0.0046 B.t.u./hr.ft.$^2$° F./in. Under similar conditions, commercially available perlite (finely divided volcanic glass) packed to a density of 10 pounds/cubic foot and evacuated to less than $10^{-6}$ mm. Hg had an apparent $k$ value of 0.0105 or about 2.3 times greater than the insulation of this invention.

It will be seen from the above description and discussion that the insulation material of this invention makes it possible to reduce the coefficient of thermal conductivity across an insulating panel to an extent heretofore not realized. The high efficiency of this insulation material is due to the unique combination of the particle types required.

This application is a continuation-in-part of Serial Number 799,619, filed March 16, 1959, for "Insulation," now abandoned in our names.

We claim:

1. Insulation material for use in an evacuated insulating panel, consisting essentially of a free-flowing, physical mixture of radiant energy absorbing and re-emitting particles ranging from 1 to 50 microns in diameter and present in a concentration from 5 to 50% by weight, radiant energy scattering and reflecting particles from 0.1 to 20 microns in diameter and present in a concentration not in excess of 40% by weight, and a carrier medium consisting of a mixture of refractory particles ranging from 200 A. to 5 microns in diameter and mineral fibers having diameters ranging from 0.1 to 50 microns, said carrier medium being present in a concentration ranging from 50 to 90% by weight.

2. Insulation material for use in an evacuated insulating panel, consisting essentially of a free-flowing, physical mixture of about 20% by weight carbon black ranging in size from about 1 to 50 microns, about 20% by weight aluminum flakes ranging in size from about 0.1 to 20 microns and about 60% by weight finely divided aluminum oxide ranging in size from about 200 A. to 5 microns; said insulation material when incorporated in said evacuated insulating panel being further characterized as having a density ranging from 7 to 12 pounds per cubic foot.

3. Insulation, comprising an evacuated enclosed structure containing therein an insulation material and at least one radiation shield located within and supported by said insulation material, said insulation material consisting essentially of a physical mixture of radiant energy absorbing and re-emitting particles ranging from 1 to 50 microns in diameter and present in a concentration equivalent to from 5 to 50% by weight, radiant energy scattering and reflecting particles ranging from 0.1 to 20 microns in diameter and present in a concentration not in excess of 40%, and a carrier medium, consisting of a mixture of refractory particles ranging from 200 A. to 5 microns in diameter and mineral fibers having diameters ranging from about 0.1 to 50 microns, present in a concentration ranging from 50 to 90% by weight.

4. Insulation, comprising an evacuated enclosed structure at least a portion of the internal surface of which exhibits low emissivity, said structure containing therein an insulation material consisting essentially of a physical mixture of radiant energy absorbing and re-emitting particles ranging from 1 to 50 microns in diameter and present in a concentration equivalent to from 5 to 50% by weight, radiant energy scattering and reflecting particles ranging from 0.1 to 20 microns in diameter and present in a concentration not in excess of 40%, and a carrier medium, consisting of a mixture of refractory particles ranging from 200 A. to 5 microns in diameter and mineral fibers having diameters ranging from about 0.1 to 50 microns, a present in a concentration ranging from 50 to 90% by weight.

References Cited in the file of this patent

UNITED STATES PATENTS

| | | |
|---|---|---|
| 28,459 | Eaton | May 29, 1860 |
| 144,232 | Spiller | Nov. 4, 1873 |
| 2,175,630 | Kiesel | Oct. 10, 1939 |
| 2,561,891 | Tucker | July 24, 1951 |
| 2,700,633 | Bovenkerk | Jan. 25, 1955 |
| 2,726,977 | See | Dec. 13, 1955 |
| 2,742,115 | Strong | Apr. 17, 1956 |
| 2,776,069 | Zimmerman | Jan. 1, 1957 |
| 2,967,152 | Matsch | Jan. 3, 1961 |

FOREIGN PATENTS

| | | |
|---|---|---|
| 21,310 | Australia | of 1936 |
| 104,448 | Australia | of 1938 |
| 549,675 | Canada | 1957 |
| 683,855 | Great Britain | 1952 |
| 730,127 | Great Britain | 1955 |